UNITED STATES PATENT OFFICE.

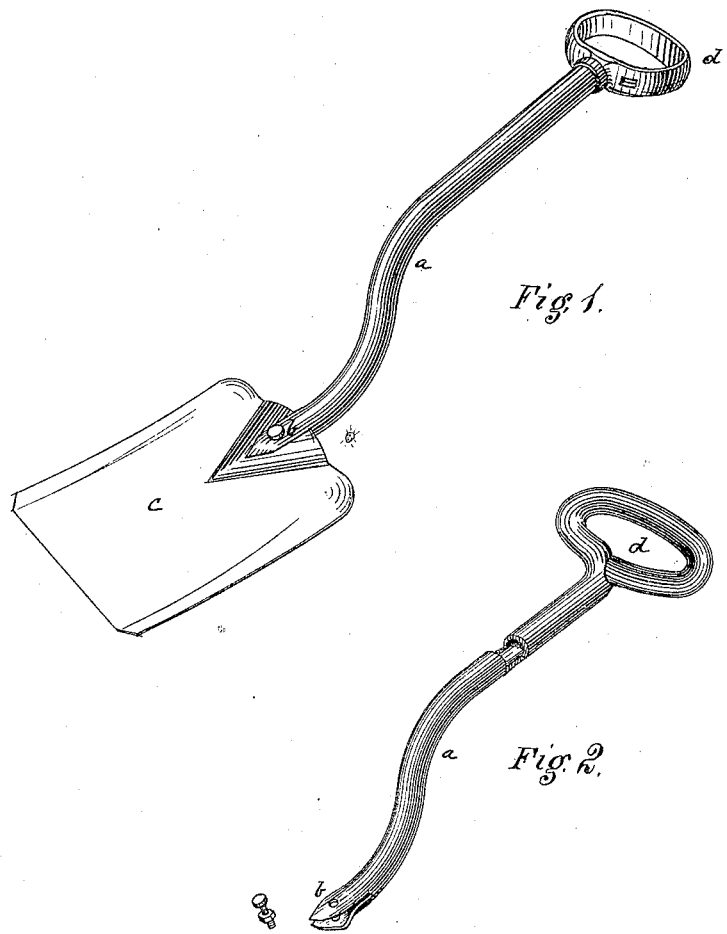

WILLIAM J. A. KENNEDY, OF PITTSBURG, PENNSYLVANIA.

IMPROVEMENT IN HANDLES FOR SHOVELS.

Specification forming part of Letters Patent No. 172,632, dated January 25, 1876; application filed September 23, 1873.

*To all whom it may concern:*

Be it known that I, WILLIAM J. A. KENNEDY, of Pittsburg, in the county of Allegheny and State of Pennsylvania, have invented an Improvement in Handles for Shovels, &c.; and I do hereby declare the following to be a full, clear, and exact description thereof, reference being had to the accompanying drawing forming a part of this specification, in which—

Figure 1 is a perspective view of a shovel provided with my improved handle, and Fig. 2 is a detached view of the handle of a slightly different construction.

My invention relates to an improvement in handles for shovels, spades, coke-forks, and other similar implements, and consists in making the same of tubular iron.

To enable others skilled in the art to make and use my improvement, I will describe its construction and use.

I form the handle $a$ of tubular iron, of a size and weight proportionate to the shovel of which it forms a part. I then bifurcate the lower end $b$ of the handle, so as to admit of the insertion of the butt end of the blade $c$. The two parts are thus riveted together; or they may be fastened by means of a bolt secured by a nut, or in any other desired way.

The handle-loop $d$ may either be formed by bending around the upper end of the tubular stock, as illustrated in Fig. 2, or an independent handle, such as is shown in Fig. 1, may be riveted directly to the upper end of the stock.

The advantages accruing from this handle are its extreme strength and durability. In addition to this it is as light and cheap as the ordinary wooden handle. The wooden handle heretofore in use is the weakest part of the shovel, being especially liable to break at the part where blade-straps are riveted to it. Such is not the case with my improvement. The blade is in this case the first to wear out, and when this occurs it may be detached from the handle, and a new blade fitted to it.

What I claim as my invention, and desire to secure by Letters Patent, is—

A tubular metallic handle for shovels and other like implements.

In testimony whereof I, the said WILLIAM J. A. KENNEDY, have hereunto set my hand.

WILLIAM J. A. KENNEDY.

Witnesses:
T. B. KERR,
JAMES I. KAY.